(No Model.)
T. S. MILLER.
TOWING CANAL BOATS, &c.
No. 600,925. Patented Mar. 22, 1898.
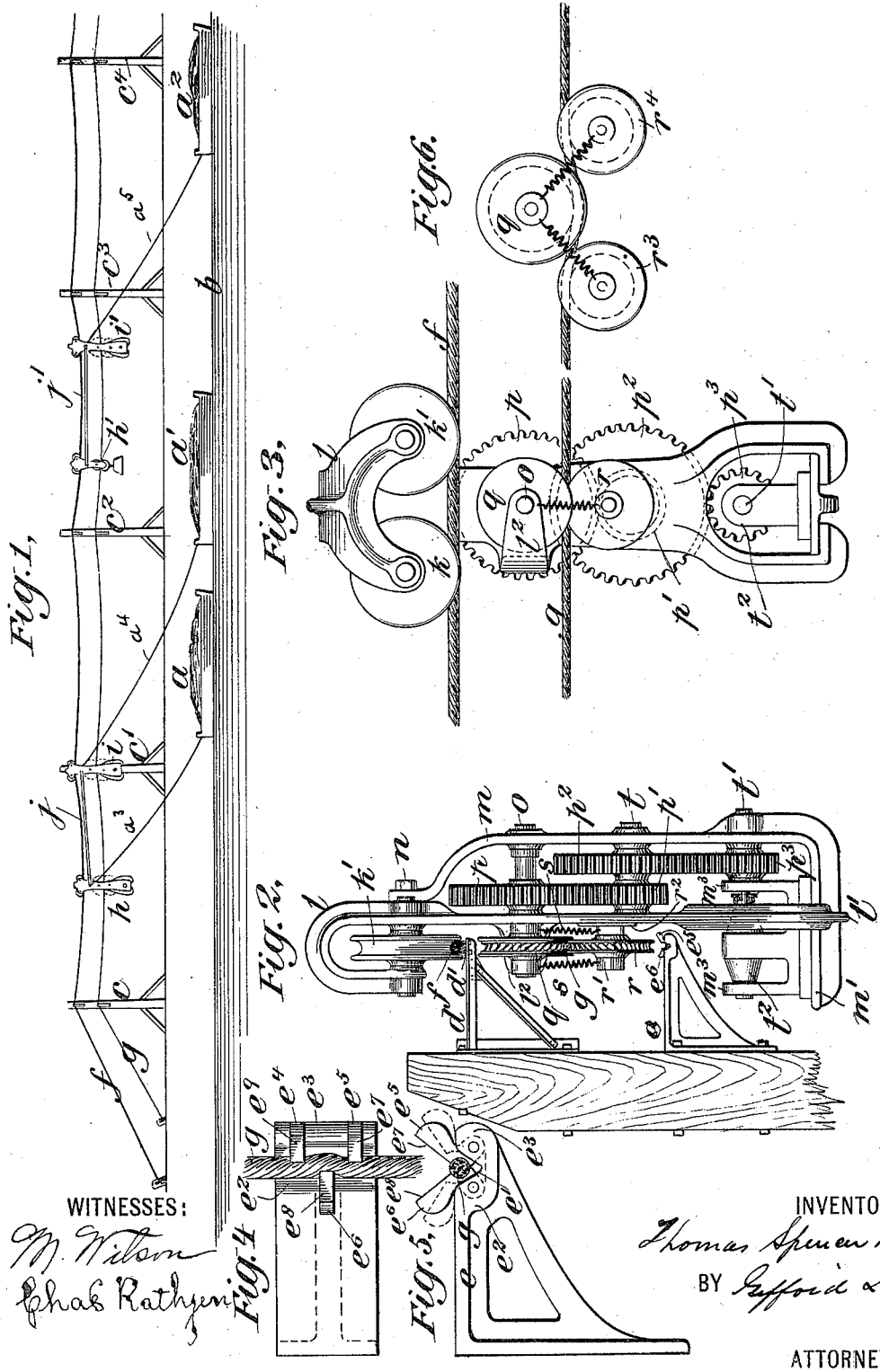
WITNESSES:
M. Wilson
Chas Rathjen
INVENTOR
Thomas Spencer Miller
BY Gifford & Bull
ATTORNEYS.

UNITED STATES PATENT OFFICE.

THOMAS SPENCER MILLER, OF SOUTH ORANGE, NEW JERSEY.

TOWING CANAL-BOATS, &c.

SPECIFICATION forming part of Letters Patent No. 600,925, dated March 22, 1898.

Application filed November 15, 1895. Renewed August 24, 1897. Serial No. 649,388. (No model.)

*To all whom it may concern:*

Be it known that I, THOMAS SPENCER MILLER, a citizen of the United States, and a resident of South Orange, in the county of Essex and State of New Jersey, have invented certain new and useful Improvements in Conveying Apparatus, of which the following is a specification.

In the accompanying drawings I have shown an apparatus designed especially for the towing of canal-boats, which, however, may be employed for the purpose of hauling other objects.

Figure 1 is a side view of the system. Fig. 2 is an end view of the carriage. Fig. 3 is a side view of the carriage. Figs. 4 and 5 are details. Fig. 6 is a detail of a modification.

$a$ $a'$ $a^2$ are canal-boats floating in the canal $b$.

$c$, $c'$, $c^2$, $c^3$, and $c^4$ are posts or other supports each of which carries upon its face toward the canal a bracket $d$ and another bracket $e$ below, as shown in Fig. 3.

$f$ is a cable anchored at both ends and supported by the bracket $d$ on each of the posts, to which bracket it is fixed by a clamp $d'$, as shown in Fig. 2.

$g$ is a traction-rope anchored at both ends and supported at each post by the bracket $e$. Interposed between this traction-rope and each of the brackets is placed mechanism, which I will now describe, which permits the traction-rope to be lifted off of its support upon the bracket $e$, but when the traction-rope rests upon said support will grip the traction-rope and oppose any longitudinal strain upon the traction-rope tending to pull it longitudinally through such grip. Thereby the longitudinal strain applied to the traction-rope at various points along its length is borne by the bracket or brackets adjacent to or near by the point at which such strain occurs. $a^3$ $a^4$ $a^5$ are tow-lines connecting each canal-boat or vehicle with a carriage.

The same mechanism being applied to each bracket $e$, a description of one will answer for all. The bracket $e$ is cast with an opening $e'$, bounded on each side by upward projections $e^2$ and $e^3$. To one of these upward projections are pivoted the dogs $e^4$ and $e^5$ and to the other is pivoted a dog $e^6$. Each of these dogs is of the form shown in Fig. 4, and Fig. 5 represents by full and dotted lines the two positions between which the dogs are capable of oscillating. The traction-rope $g$ is gripped between the dogs on the projection $e^3$, and the dog on the projection $e^2$ when such traction-rope is supported by the bracket $e$. The dog $e^6$ is opposite the space between the dogs $e^4$ and $e^5$, so as to produce a bend in the rope $g$ and insure firmness of hold against longitudinal strain. The surface of each dog, as shown in Fig. 5, which is in contact with the rope when in gripping position, is in the form of the arc of a circle, extending in contact with the surface of the rope, above the horizontal diameter of the rope, so that whenever the rope is lifted the contact between the rope and the portions of the dogs above such horizontal diameter will cause the dogs to be lifted from the position shown in full lines to that shown in dotted lines, Fig. 5. When, however, the rope is dropped, it will be deflected down into its seat in the grooves of the dogs by the dog projections $e^7$, $e^8$, and $e^9$, flaring upwardly and outwardly above such grooves. The groove of each dog also extends, as shown in Fig. 5, downwardly in contact with the rope, below the horizontal diameter of the rope, so that when the rope is dropped into the groove, its weight resting upon the lower portion of the grooves will swing the dogs forward from the dotted-line to the full-line position and cause the rope to be gripped. Thus while the weight of the rope resting upon the dogs causes the dogs to grip the rope and hold it against longitudinal strain, nevertheless the lifting of the rope causes the dogs to let go and the weight of the projections $e^7$, $e^8$, and $e^9$ hold the dogs open, as shown in dotted lines, Fig. 5, till they are closed by the weight of the rope.

$h$ and $h'$ are pilot-carriages, and $i$ and $i'$ are main carriages. Each pilot-carriage is coupled to a main carriage by the connection $j$ or $j'$. The pilot-carriage may carry a motor as well as the main carriage and be of duplicate construction, as shown at $h$, or it may carry a weight, as shown at $h'$.

I will now proceed to describe the main carriage $i$, which is shown in Fig. 2 as having lifted the traction-rope off of its support on the bracket $e$.

$k$ $k'$ are two wheels running on the cable $f$ and carrying the carriage. These wheels are journaled at opposite ends of their axles in the carriage-frame, which extends in a loop $l$ above the wheels and thence downward to $l'$.

$m$ is a separate frame connected with the frame $l$ at $n$ and extending outward and then downward parallel with the frame $l\ l'$ and provided at its lower extremity with an inwardly-projecting horizontal platform $m'$.

$o$ is a shaft journaled in the frame $m$ and in a bracket $l^2$, connected with the frame $l$.

$p$ is a gear-wheel fixed to said shaft between the frames $l$ and $m$.

$q$ is a traction-wheel fixed to said shaft between the frame $l$ and the bracket $l^2$.

$r$ is a presser, preferably, as shown, in form of a wheel, on opposite side of the rope $g$ from the traction-wheel $q$, and the rope is clamped between these two wheels.

$r'$ is a stud upon which the presser-wheel $r$ revolves, and this stud is fixed to a slide $r^2$ on the frame $l$. The spiral springs $s$ and $s'$ tend to pull the slide $r^2$ upward and supply the power for clamping the rope between the two wheels. Instead of having one presser-wheel, as $r$, of Figs. 2 and 3, two presser-wheels, as $r^3\ r^4$, may be employed, arranged so that the traction-wheel $q$ bears against the rope opposite the space between them, so as to give the rope a bend, as shown in Fig. 6, and thereby secure a firmer hold. The shaft $t$ is journaled on the frames $l$ and $m$ and carries the gears $p'$ and $p^2$, that are fixed to it. The shaft $t'$ is journaled in the frame $m$ and in the uprights $m^2$ and $m^3$, extending upward from the platform $m'$, and this shaft $t'$ carries the armature $t^2$ of an electric or other motor. The motor drives the train of gearing $p^3$, $p^2$, $p'$, and $p$ whereby the traction-wheel $q$ is driven, producing the traction on the traction-rope $g$, whereby the carriage is driven forward or back along the cable.

The traction-wheel $q$ and presser-wheel $r$ are constructed, as shown in Fig. 2, so that the flanges of the wheel $r$ fit between and overlap the flanges of the wheel $q$. The grooves of both wheel $q$ and wheel $r$ are formed, as shown in Fig. 2, with an imprint of the surface of the strands against which they bear on opposite sides of the rope $g$. Such imprint may be omitted from the wheel $r$, which, however, acts as a presser to hold the strands of the rope $g$ in the imprints corresponding with such strands in the groove of the traction-wheel $q$, and the efficiency of such presser is increased by having such imprint also upon the traction or presser wheel $r$, as shown.

Another important feature of my invention, which is illustrated in Fig. 1, calls for the connections between the carriages $h$ and $i$ or between the carriages $h'$ and $i'$, illustrated as $j$ or $j'$. In practice the supports $c\ c'\ c^2\ c^3$ are spaced approximately the same distance apart. In practice, therefore, I intend to space the carriages by the connecting-bar $j$, so that the space between them will be approximately one-half the span between the supports. The advantage of this connection is easily understood by the following explanation: As $i$ leaves the saddle or support of the post $c'$ it descends the incline due to the catenary of the cable. Hence its full power is not called upon. At this time $i$ is arranged to push $h$ ahead of it, for $h$ is about in a position to commence to ascend the curve of the catenary, and this pushing action is carried on until $h$ passes the next support $c$, whereupon $h$ pulls $i$, by virtue of descending the incline of the catenary. Furthermore, it will be readily understood that when the carriage $h$ is about ready to climb the maximum incline of the cable as it approaches the support $c$, $i$ is in the center of the cable. Its weight tends to lessen the angle of incline, whereby the carriage $h$ does not have to ascend so steep a grade as it would if it were not for the presence of $i$ in the center of the cable. Moreover, the traction of one carriage will always be pushing backward against a support behind, while the other is pulling against a support ahead. The same may be said of $h'$, which is illustrated simply as an auxiliary carriage.

I do not wish to limit myself to any proportionate distance between the carriages, nor do I wish to limit myself to the particular form of grip shown in Figs. 4 and 5, nor to their being attached to all of the supporting-brackets, for in some instances it is readily understood that if this grip occurred at less frequent intervals it would answer all practical purposes. In that event instead of the bracket shown in Fig. 5 containing therein a grip it would simply show a rest of any suitable sort for the traction-rope to rest upon.

I claim—

1. In a conveying apparatus, in combination, a carriage, provided with mechanism adapted to run on a supporting-cable, a traction-rope and a support for said traction-rope adapted to grip the same, substantially as described.

2. In a conveying apparatus, in combination, a carriage, provided with mechanism adapted to run on a supporting-cable, a traction-rope, a support for said traction-rope, means upon the carriage whereby said traction-rope is lifted from said support as the carriage passes and means upon said support whereby said rope is gripped when resting thereon, substantially as described.

3. In combination, a traction-rope, stationary end supports therefor, an intermediate support provided with a dog arranged on one side of the traction-rope extending beneath the rope and having an outwardly-extending projection $e^7$, a carriage and traction mechanism mounted on said carriage adapted to traverse said traction-rope, substantially as described.

4. In a conveying apparatus, in combination, a carriage, a traction-wheel mounted upon said carriage, means whereby said wheel is driven, a presser acting in opposition to said traction-wheel; said traction-wheel having upon its periphery the imprints of the strands of a rope, substantially as described.

5. In combination, a traction-rope, stationary end supports therefor, an intermediate support provided with means for gripping said traction-rope, a carriage and traction mechanism mounted on said carriage adapted to traverse said traction-rope, substantially as described.

6. In a conveying apparatus, in combination, a vehicle, a carriage, a traction-rope for said carriage, supports for said traction-rope and means upon a plurality of said supports whereby said traction-rope is held against longitudinal movement, substantially as described.

7. In a conveying apparatus, in combination, a series of vehicles, a series of carriages, connections between the vehicles and carriages, a traction device on each carriage, a traction-rope gripped thereby and devices interposed between the members of the series of carriages; whereby said traction-rope is held against the longitudinal pull of said traction devices, substantially as described.

8. In a conveying apparatus in combination with a flexible trackway and the supports thereof, a plurality of carriages spaced approximately one-half the distance between the supports and coupled together, substantially as described.

THOS. SPENCER MILLER.

Witnesses:
M. WILSON,
CHAS. RATHJEN.